US009427680B2

(12) United States Patent
Cnossen et al.

(10) Patent No.: US 9,427,680 B2
(45) Date of Patent: Aug. 30, 2016

(54) REMOVAL DEVICE IN PARTICULAR FOR MICRO-BUBBLES, VOLATILE COMPOUNDS AND DIRT

(75) Inventors: Jan Henk Cnossen, Koudum (NL); Terence Arthur Devlin, Apeldoorn (NL)

(73) Assignee: FLAMCO B.V., Bunshoten (BL)

( * ) Notice: Subject to any disclaimer, the term of this patent is extended or adjusted under 35 U.S.C. 154(b) by 129 days.

(21) Appl. No.: 14/005,949

(22) PCT Filed: Apr. 13, 2012

(86) PCT No.: PCT/NL2012/050243
§ 371 (c)(1),
(2), (4) Date: Oct. 30, 2013

(87) PCT Pub. No.: WO2012/141585
PCT Pub. Date: Oct. 18, 2012

(65) Prior Publication Data
US 2014/0048495 A1    Feb. 20, 2014

(30) Foreign Application Priority Data

Apr. 15, 2011  (NL) ........................................ 2006614
Jun. 6, 2011  (NL) ........................................ 2006902

(51) Int. Cl.
*B01D 21/00* (2006.01)
*B01D 17/02* (2006.01)
(Continued)

(52) U.S. Cl.
CPC ....... *B01D 21/0039* (2013.01); *B01D 17/0211* (2013.01); *B01D 19/0042* (2013.01); *B01D 21/0033* (2013.01); *B01D 21/245* (2013.01);
(Continued)

(58) Field of Classification Search
CPC .. B01D 19/00; B01D 19/0047; B01D 17/025; B01D 21/02; B01D 21/0045; B01D 21/0063; B01D 21/245; B01D 21/0039; B01D 2221/02
USPC ............... 95/253, 260; 96/182, 204; 210/801, 210/521, 532.1, 539, 540, DIG. 5
See application file for complete search history.

(56) References Cited

U.S. PATENT DOCUMENTS 4,151,087 A * 4/1979 Sakaguchi ..................... 210/109
4,802,978 A * 2/1989 Schmit et al. ................ 210/104
(Continued)

FOREIGN PATENT DOCUMENTS

AU           607345 B    2/1991
EP         2266676 A1   12/2010
WO    2011037465 A1    3/2011

*Primary Examiner* — Duane Smith
*Assistant Examiner* — Minh-Chau Pham
(74) *Attorney, Agent, or Firm* — Hoffmann & Baron, LLP (57) ABSTRACT

A removal device for removing gas bubbles and/or dirt particles from a liquid in a liquid conduit system or for removing an undesired liquid from the liquid in the liquid conduit system includes: a housing having: an entry, at least one exit, an inner space defined by the housing, at least one tube placed within the housing, where the at least one tube extends substantially between the entry and the exit and defines a main flow channel, at least one branch flow passage located near the entry for allowing fluid communication between the main flow channel and an area outside the tube and within the inner space defined by the housing, at least one return flow passage located near the exit for allowing fluid communication between the area outside the tube and the main flow channel, at least one quiet zone formed within the inner space.

24 Claims, 8 Drawing Sheets

(51) Int. Cl.
  *B01D 19/00*  (2006.01)
  *B01D 21/24*  (2006.01)
  *B01D 21/32*  (2006.01)
  *B01D 21/34*  (2006.01)
(52) U.S. Cl.
  CPC ........... *B01D 21/2494* (2013.01); *B01D 21/32* (2013.01); *B01D 21/34* (2013.01); *Y10T 29/49* (2015.01)

(56) References Cited

U.S. PATENT DOCUMENTS

| | | | |
|---|---|---|---|
| 5,518,610 A * | 5/1996 | Pierpoline | 210/104 |
| 5,858,252 A * | 1/1999 | Darcy | 210/788 |
| 6,730,222 B1 | 5/2004 | Andoh et al. | |
| 7,008,546 B2 * | 3/2006 | Edmondson | 210/801 |
| 7,083,736 B1 * | 8/2006 | Hirs | 210/800 |
| 7,287,651 B2 * | 10/2007 | Myers et al. | 210/519 |
| 7,287,736 B2 * | 10/2007 | Hauck | 248/318 |
| 8,313,658 B2 * | 11/2012 | Cnossen | 210/801 |
| 8,801,842 B2 * | 8/2014 | Vandenbulcke | 96/207 |
| 2005/0081716 A1 | 4/2005 | Morita et al. | |
| 2005/0155925 A1 * | 7/2005 | Schipper | 210/497.1 |
| 2005/0184007 A1 | 8/2005 | Allard et al. | |
| 2008/0110344 A1 * | 5/2008 | Follette | B01D 19/0063 96/210 |
| 2010/0236409 A1 | 9/2010 | Cnossen | |

* cited by examiner

REMOVAL DEVICE IN PARTICULAR FOR MICRO-BUBBLES, VOLATILE COMPOUNDS AND DIRT

CROSS-REFERENCE TO RELATED APPLICATIONS

This application is the National Stage of International Application No. PCT/NL2012/050243, filed Apr. 13, 2012, which claims the benefit of Netherlands Application Nos. NL 2006614, filed Apr. 15, 2011, and NL 2006902, filed Jun. 6, 2011, the contents of all of which are incorporated by reference herein.

FIELD OF THE INVENTION

The present invention relates to a removal device for removing micro-bubbles and/or dirt from a liquid in a liquid conduit system and/or for removing a first liquid from a second liquid in a liquid conduit system. Removal devices are known.

BACKGROUND OF THE INVENTION

In the prior art, various removal devices have been developed. WO2011/037465 discloses a removal device 10 with a main flow channel 22 defined by plates 20 placed transverse to the main flow direction within the inner space 18 of the housing 12, see FIG. 1 of WO2011/037465. The main flow channel 22 extends from the entry 14 to the exit 16, where near the exit 16 an end plate 50 is placed, transverse to the direction of the main flow channel 22, with a constricted opening 52. An upper quiet zone 44 and a lower quiet zone 48 are located in the upper and lower region of the inner space 18 respectively. In the upper quiet zone 44 and the lower quiet zone 48, the flow velocity is substantially lower than the velocity of the main flow 58. This lower velocity allows the rising of gas particles and the settling of dirt particles in the upper quiet zone 44 and the lower quiet zone 48 respectively.

The end plate 52 creates a pressure drop over the end plate 52 in the main flow in the main flow channel 22. This urges parts of the main flow to branch off between the plates 20. The branch flows flow upwards and downwards to the respective quiet zones 44 and 48. From the quiet zones 44 and 48, return flows 64 and 66 flow towards a merge point 68 located in a return flow channel behind the end plate 50 and near the exit 16.

The removal device according to WO2011/037465 is specifically suitable for certain sizes. It was found to be less effective to simply scale up the removal device of WO2011/037465 in order to obtain a removal device of a greater size.

US2008/0110344 discloses a de-aeration device which is rather primitive.

It was found that in general, removal devices which are known in the prior art have disadvantages. The efficiency of removal of dirt and/or gas particles is lower than desired. Moreover, the resistance to flow is higher than desired.

Known removal devices are also not very well capable of removing a liquid from another liquid. In particular, removing traces of an undesired volatile liquid from a base liquid is not very well performed by known removal devices.

OBJECT OF THE INVENTION

It is an object of the invention to provide an alternative removal device for removing micro-bubbles and/or dirt particles from a liquid in a conduit system and/or for removing a first liquid from a second liquid in a conduit system, in particular for removal devices of relatively large size.

SUMMARY OF THE INVENTION

The invention provides a removal device for removing gas bubbles and/or dirt particles from a liquid in a liquid conduit system or for removing particles of a heavier or lighter liquid from the liquid in the liquid conduit system, the removal device comprising:
  a housing comprising:
    an entry,
    at least one exit,
    an inner space defined by the housing,
    at least one tube placed within the housing, wherein the at least one tube extends substantially between the entry and the exit, wherein the tube substantially defines a main flow channel,
    at least one branch flow passage located near the entry, the branch flow passage allowing fluid communication between the main flow channel and an area outside the tube and within the inner space defined by the housing,
    at least one return flow passage located near the exit, the return flow passage allowing fluid communication between the area outside the tube and the main flow channel,
    at least one quiet zone formed within the inner space, wherein, in use, at least one branch flow originating from the at least one branch flow passage enters the at least one quiet zone and flows through the quiet zone and from the at least one quiet zone as a return flow through the at least one return flow passage, wherein the liquid in the at least one quiet zone has a substantially smaller velocity than the liquid in the main flow channel, allowing dirt or particles of a heavier liquid to settle and/or gas bubbles or particles of a lighter liquid to rise in the quiet zone.

The removal device according to the invention provides an efficient removal, with a relative low resistance to flow. The removal device is suitable for greater sizes.

Upon entry in the housing of the removal device, the liquid flow is divided in a main flow and a branch flow, which branches off from the main flow through an opening, defined as a branch flow passage. The bulk of the flow flows through the main flow channel, which is defined by the tube located within the inner space of the housing. The branch flow passage has a smaller surface area than the main flow channel and is generally located at the edge of the main flow channel.

Initially, the flow velocity at the beginning of the branch flow passage is substantially equal to the velocity of the main flow.

The separation of liquids in a liquid/liquid flow comprises separating undesired or contaminating liquids from a base liquid. For instance, a base liquid can be thermal oil. Thermal oil may have undesired (gaseous) volatile compounds, which need to be separated from the thermal oil. In an embodiment, the removal device according to the invention is configured for separate these two liquids. In the quiet zone, liquids having a lower density than the base liquid will rise to the top of the removal device, and liquids having a higher density than the base liquid will settle at the bottom of the removal device. Other liquids than thermal oil are also possible.

In an embodiment, the removal device comprises at least two plates, which are provided within the inner space defined by the housing, wherein the plates extend substantially transverse to the direction of the flow. The plates define a branch flow trajectory and, in use, guide the branch flow along the branch flow trajectory which comprises the quiet zone.

In an embodiment, the at least two plates are connected to the outer side of the at least one tube and connected to the housing of the removal device.

In an embodiment, the at least two plates have at least one constricted opening or define the at least one constricted opening between an edge of the plate and the housing, wherein, in use, the branch flow flows through the at least one constricted opening.

In an embodiment, the inner space of the housing is divided by the plates in at least:
- a first chamber comprising the area, wherein the branch flow passage provides access from the main flow channel into the first chamber,
- a second chamber comprising the quiet zone, and
- a third chamber comprising the area, wherein the return flow passage provides access from the third chamber into the main flow channel, wherein the branch flow trajectory extends through the first, second and third chamber. At least one first constricted opening is provided between the first chamber and the second chamber, wherein at least one second constricted opening is provided between the second chamber and the third chamber.

In an embodiment, the first chamber and the at least first constricted opening are configured to distribute the branch flow over a substantial part of a height of the removal device.

In an embodiment, a direction of flow in the quiet zone has a substantially different direction than a direction of flow in the main flow channel. An angle between the direction of flow of the branch flow in the quiet zone and the direction of flow in the main flow channel may be greater than 45 degrees. A skilled person will notice that in the quiet zone, local differences in direction of flow may occur. Here, direction of flow is intended to mean the general direction of flow in the quiet zone.

In an embodiment, the branch flow flows along a branch flow trajectory which is defined by flow guides. In an embodiment, the branch flow flows along a branch flow trajectory, which in top view along a substantial portion thereof has a component of movement which is oriented transverse to the main flow direction. In top view the branch flow trajectory does not extend substantially parallel to the main flow direction.

In an embodiment, in top view the branch flow trajectory is not straight.

In an embodiment, the branch flow flows along a branch flow trajectory which, when seen in top view, has a substantially 'zigzag' form, wherein a right part of the branch flow trajectory is located on a right side of the main flow channel, a left part of the branch flow trajectory is located on a left side of the main flow channel, and a central part of the branch flow trajectory traverses the main flow channel. Depending on the placement of the constricted openings, the branch flow trajectory can also have other forms.

In an embodiment, the at least one branch flow passage and/or the at least one return flow passage are defined by an opening in the at least one tube.

In an embodiment, the at least one quiet zone comprises:
- an upper quiet zone,
- a lower quiet zone, and
- a central quiet zone, wherein the upper and lower quiet zone have, seen from a top view, a greater surface area than the central quiet zone.

In an embodiment, a space between the entry and/or the exit and the at least one tube defines at least one branch flow passage near the entry and/or at least one return flow passage near the exit.

In an embodiment, the entry is shaped as an entry tube extending inwards into the housing, wherein the exit is shaped as an exit tube extending inwards into the housing, wherein the at least one tube extends between the entry tube and the exit tube, wherein at least one gap is provided between the at least one tube and the entry tube, which gap defines the branch flow passage, and wherein at least one gap is provided between the at least one tube and the exit tube, which gap defines the return flow passage.

In an embodiment, the gap(s) is at least provided at the upper side and the lower side of the main tube. In this way, the branch flow comprises at least an upper part of the main flow in the tube and a lower part of the main flow in the tube.

In an embodiment, the removal device comprises a branch flow channel which is provided downstream of the branch flow passage and which extends over a distance in the direction of the main flow channel. In an embodiment, the removal device comprises a return flow channel which is provided upstream of the return flow passage and which extends over a distance in the direction of the main flow channel.

In an embodiment, the branch flow channel and return flow channel are curved and extend along the wall of the housing, when seen in top view.

In an embodiment, the branch flow channel and return flow channel are defined between respective plates and the wall of the housing.

In an embodiment, the branch flow channel originates at the constricted opening, and the return flow channel connects to the constricted opening.

In an embodiment, the branch flow channel and return flow channel create a branch flow/return flow having a substantial S-shape, when seen in top view. In an embodiment, the branch flow channel and return flow channel create a branch flow which flows over a distance which is opposite to the direction of the main flow.

In an embodiment, the removal device comprises a magnet which is provided at a dirt discharge for attracting dirt particles, such as magnetite. The material on which the magnet is fitted, as part of the embodiment, may be manufactured from a plastic or a composite, in order to improve the effect of the magnetic field through the material.

In an embodiment, the housing has a cylindrical shape, having a main axis which is oriented transverse to the fircion of flow in the main channel. In particular, the housing may be round, when seen in top view.

The invention further relates to a method comprising providing a housing comprising an entry and an exit and providing at least one tube in the housing.

The invention further relates to a method comprising providing a removal device according to the present invention in a conduit and guiding a liquid flow or a liquid/liquid flow through the removal device.

The invention further relates to the manufacturing of a removal device according to the present invention, comprising providing a housing with an entry and an exit, placing at least one tube in the housing according the configuration of the present invention.

The invention further relates to a method for removing dirt and/or volatile compounds and/or gas particles from a conduit system, a method comprising placing a removal device according to the present invention in a conduit and causing a flow of liquid or a liquid/liquid through the removal device, wherein gas particles and/or volatile compounds and/or dirt particles are removed.

Herein below, the invention is elucidated with reference to non-limiting drawings.

BRIEF DESCRIPTION OF THE DRAWINGS

Like reference numerals denote like parts.

DETAILED DESCRIPTION OF THE INVENTION

FIGS. 1-5 and 7 show a removal device 10 with a housing 12, an entry 14 and an exit 16. The entry 14 and the exit 16 are configured to be connected to a conduit system, in such a way that the removal device 10 is provided in-line with the conduit system. A typical conduit system for example is a warm water conduit system of a heating installation.

The housing 12 defines an inner space 18 with a certain volume. A tube 20 is provided in the housing 12. The tube 20 extends substantially along the direction 300 of the flow. The tube extends between the entry 14 and the exit 16. The tube 20 substantially defines a main flow channel 22. The tube 20 can have a substantially circular, square or rectangular form. The main flow channel 22, therefore, can also have a substantially circular, square or rectangular form.

The tube 20 has a surface area which is smaller than the surface area of the entry 14 and/or exit 16.

In another embodiment, the surface area of the tube can also be equal or larger than the surface area of the entry 14 and/or exit 16.

The entry 14 and/or the exit 16 are formed as an entry tube 11 and an exit tube 19 which extend into the inner space 18 of the housing 12. The entry tube 11 and/or exit tube 19 have respective ends 15 and 17, which are provided near the outer surfaces of the tube 20. The end 15 projects into the housing over a distance 206. The end 17 projects into the housing over a distance 207. A gap 4 between an outer edge 15 of the extended entry tube 11 and the tube 20 defines a branch flow passage 24. A gap 6 between the outer edge 17 of the extended exit and the tube 20 defines a return flow passage 26. A diameter 200 of the tube 20 is smaller tha a diameter 201 of the entry tube 11 and a diamater 202 of the exit tube 19.

It is noted that these gaps 4 and 6 may have different forms. The gap 4 and/or 6 in general can have a ring-like form, or can be multiple openings in varying shapes. The gap 4 defines a branch off point 126 from the main flow channel 22. Because the diameter 200 of the tube 20 is smaller than the diameter 201 of the entry tube, a ridge 204 of the tube 20 projects into the main flow channel 22, against the direction of flow 300. This configuration allows an easy branching off of the branch flow from the main flow.

The gap 6 defines a merge point 90. In an embodiment, the gaps 4, 6 are constructed such that they extend substantially around the circumference of the tube 20, continuously or intermittently. This allows the branch flow to be taken from the outer portion of the main flow, at least in the upper and lower portion of the main flow, and in an embodiment around substantially the entire circumference of the main flow. In another embodiment, the gap(s) 4 is at least provided at the upper side and the lower side of the tube 20. In this way, the branch flow comprises at least an upper part of the main flow in the tube 20 and a lower part of the main flow in the tube 20.

In particular, the entry tube 11, the tube 20 and exit tube 19 may be formed as a single, integral tube having passages in the wall which define the branch flow passage and the return flow passage.

Two plates 30 and 40 extend substantially transverse to the direction 300 and are connected to the tube 20. The two plates 30 and 40 surround the tube 20, i.e. the tube 20 extends through plates 30 and 40 and is connected to said plates over the entire circumference of the tube. The two plates 30 and 40 are connected to the housing 12 at one vertical edge 32 and 42 of the respective plates. The other vertical edge 34 and 44 of the two plates 30 and 40 is located at a distance 35 and 45 from the housing 12. The horizontal end ridges 36 and 38 of plate 30 are connected to horizontal plates 50 and 52 respectively. The horizontal end ridge 46 and 48 of plate 40 are connected to horizontal plates 54 and 56 respectively. The sides 51, 53, 55, and 57 of the horizontal plates 50, 52, 54, and 56 are connected to the housing 12. The sides 51, 53, 55, and 57 have a substantially same shape as the housing 12. The horizontal plates 50, 52, 54, and 56 are placed at a distance 60, 62, 64, and 66 from the tube 20 respectively. These distances 60, 62, 64, and 66 can be different from each other.

A quiet zone 100 is defined by the housing, the plates 30, 40, 50, 52, 54 56 and the tube 20. An upper quiet zone 70 (or bubble rising zone) of the quiet zone 100 is defined in an upper region of the housing 12. Analogous to this, a lower quiet zone 80 (or settlement zone) is defined in the lower region of the housing 12. The upper quiet zone 70 is defined by the side wall of the housing 12, and the horizontal plates 50 and 54. The lower quiet zone 80 is defined by the side wall of the housing 12, and the horizontal plates 52 and 56.

A central quiet zone 101 is located between the upper quiet zone 70 and the lower quiet zone 80. The central quiet zone surrounds the tube 20.

The surface area S2 of the tube 20 is smaller than the surface area S1 of the entry 14 and the exit 16. A distance 2 between an inner side of entry pipe 11 and an outer side of the tube 20 determines a surface area S3 of both the branch flow passage 24 and the return flow passage 26. The smaller the distance 2, the smaller the volume of liquid or liquid/liquid that flows through the branch flow passage 24 and the return flow passage 26.

The two plates 30 and 40 are connected to the housing 12. The two plates 30 and 40 separate the inner space 18 of the housing 12 in three chambers 21, 23, and 25. The two plates 30, 40 have one or more constricted openings 31 and 41 for fluid communication between the separated chambers 21, 23, and 25 within the inner space 18 of the housing 12 or define these constructed openings 21, 23 together with the housing. The upper and lower quiet zone 70 and 80 are located in the upper region of chamber 23 and in the lower region of chamber 23 respectively. The upper and lower quiet zone 70 and 80 are defined by the plates 30 and 40 and the side wall of the housing 12.

The chamber 21 is defined by the housing 12, the tube 20, the substantially vertical plate 30, and two substantially horizontal plates 50 and 52, which are connected to the housing 12 and the substantially vertical plate 30. Plate 30 is connected to the tube 20 and the housing 12.

At the upper side 72 of the removal device 10, an air removal valve 71 is provided which is known from the prior art.

At the lower side 82 of the removal device 10, a dirt discharge 81 is provided. Both at the upper side 72 as at the lower side 82, tapering surfaces are provided which cause the gas bubbles to arrive at the valve 71 respectively cause the dirt particles to arrive at the discharge 81.

In different embodiments, it is possible to use more plates with one or more constricted openings. Constricted openings 31 and 41 can be one or more holes located within at least one plate 30 or 40 or can be located between the at least one plate 30 or 40 and the housing 12, or a combination of these variants.

The constricted openings 31, 41 are elongate gaps which extend substantially vertically over a substantial part of the height of the removal device. In top view, the constricted opening 31 is located on a right side of the removal device and the constricted opening 41 is located on a left side of the removal device.

In an embodiment, a magnet 140 is provided near the dirt discharge 81, at the lower end of the housing. The magnet may be a very strong magnet, for instance from neodymium. The magnet 140 may be connected to the discharge valve (not shown) or to the housing 12. The magnet 140 may be removably connected to the removal device.

In use, the magnet 140 attracts the dirt particles. When the removal device is cleaned, the magnet 140 is removed, and subsequently the dirt discharge 81 is opened. It is also possible that the dirt discharge comprises a removable plug, and the magnet is connected to said plug or integrated with the plug. In this embodiment, the removing of the magnet and the opening of the dirt discharge can be carried out in a single operation, i.e. by removing the plug. This embodiment may be suitable in combination with a metal (e.g. steel) housing 12.

In a different embodiment, a mixture of different liquids is separated into separated liquids. Particles of a lighter liquid than the base liquid may rise and particles of a heavy fluid may settle. When the particles of the lighter liquid are volatile and flammable, they are removed through a controlled valve 71. The valve 71 may operate on the basis of a viscosity measurement. The controlled valve 71 controls the removal of the flow of flammable and volatile particles, wherein the controlled valve 71 may be connected to a reservoir, which may be used to collect the volatile and flammable particles.

Figure 6:
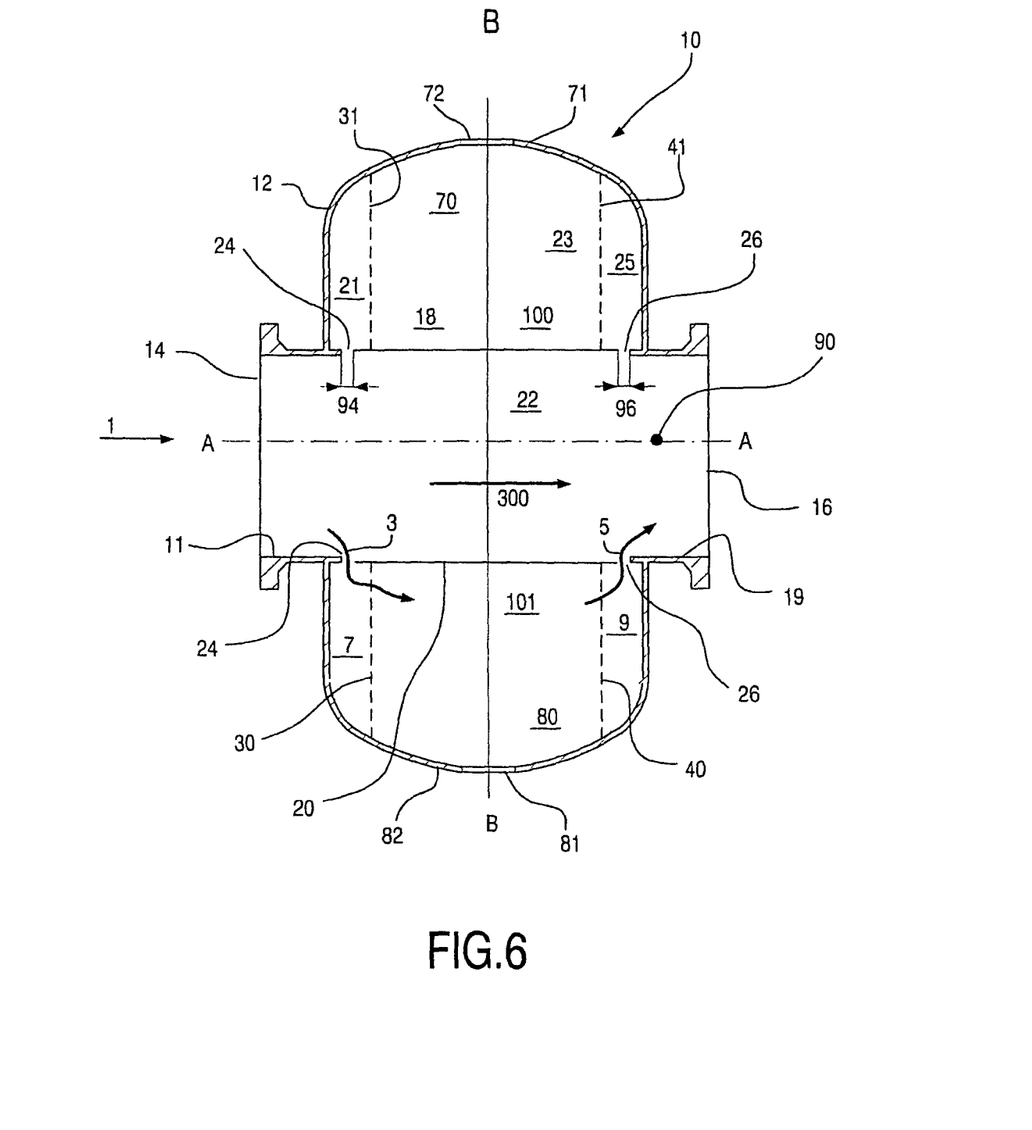
FIG. 6 shows a schematic longitudinal cross-sectional view of a different embodiment of the removal device according to the invention.

In a different embodiment, shown in FIG. 6, the tube 20 is connected to the entry tube 11 and the exit tube 19. A constricted opening 94 in the tube 20 near the entry 14 defines a branch flow passage 24. A constricted opening 96 in the tube 20 near the exit 16 defines a return flow passage 26. The constricted opening 94 and/or 96 may be provided as holes in various forms in the tube 20.

The two substantially vertical plates 30 and 40 are placed within the housing 12 and are connected to the tube 20. The plates 30 and 40 separate the inner space 18 into three chambers 21, 23, and 25. The chamber 23 comprises a quiet zone 100. The quiet zone 100 comprises an upper quiet zone 70, a central quiet zone 101, and a lower quiet zone 80. Plates 30 and 40 have at least one constricted opening 31 and 41 respectively. These constricted openings 31 and 41 provide fluid communication between chamber 21 and chamber 23, and between chamber 23 and chamber 25 respectively.

Here, plates 30 and 40 have a large number of small constructed openings 31, 41 which are spread evenly over their surface. The openings 31, 41 spread the branch flow evenly over the quiet zone 100.

At the upper side 72 of the removal device 10, an air removal valve 71 is provided which is known from the prior art.

At the lower side 82 of the removal device 10, a dirt discharge 81 is provided. Both at the upper side 72 as at the lower side 82, tapering surfaces are provided which cause the gas bubbles to arrive at the valve 71 respectively cause the dirt particles to arrive at the discharge 81.

Operation

Figure 1:
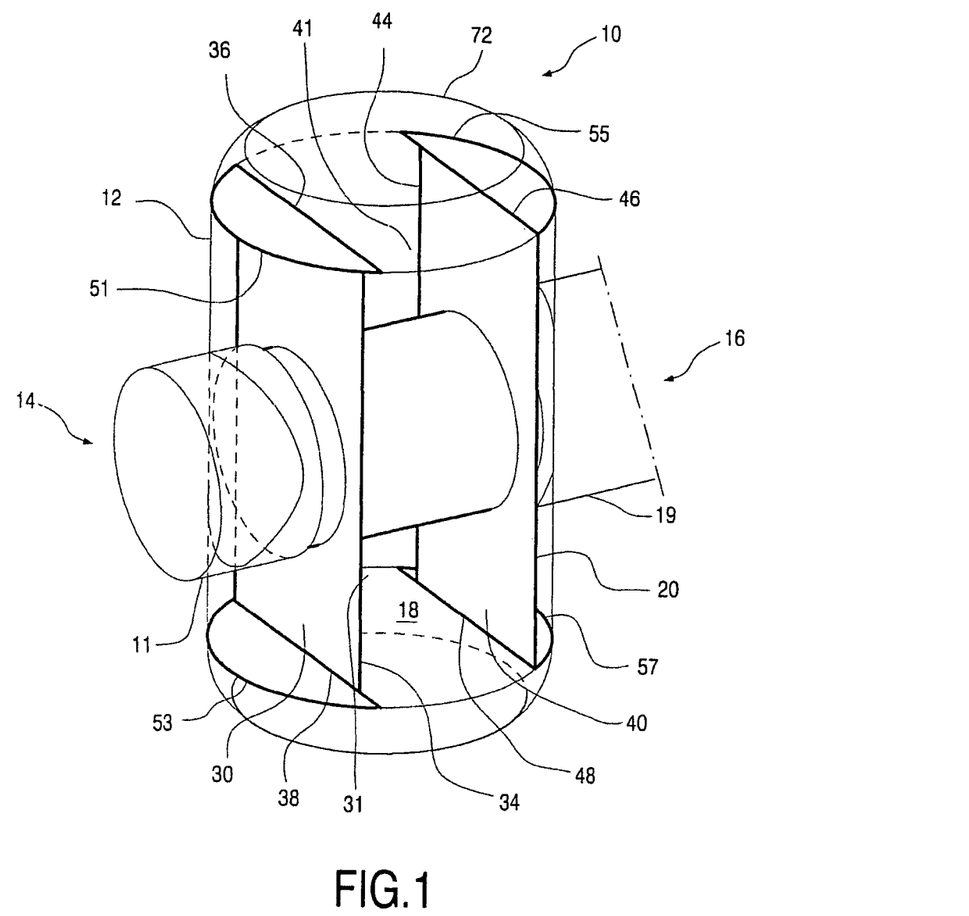
FIG. 1 shows a perspective view of the removal device according to the invention.
Figure 2:
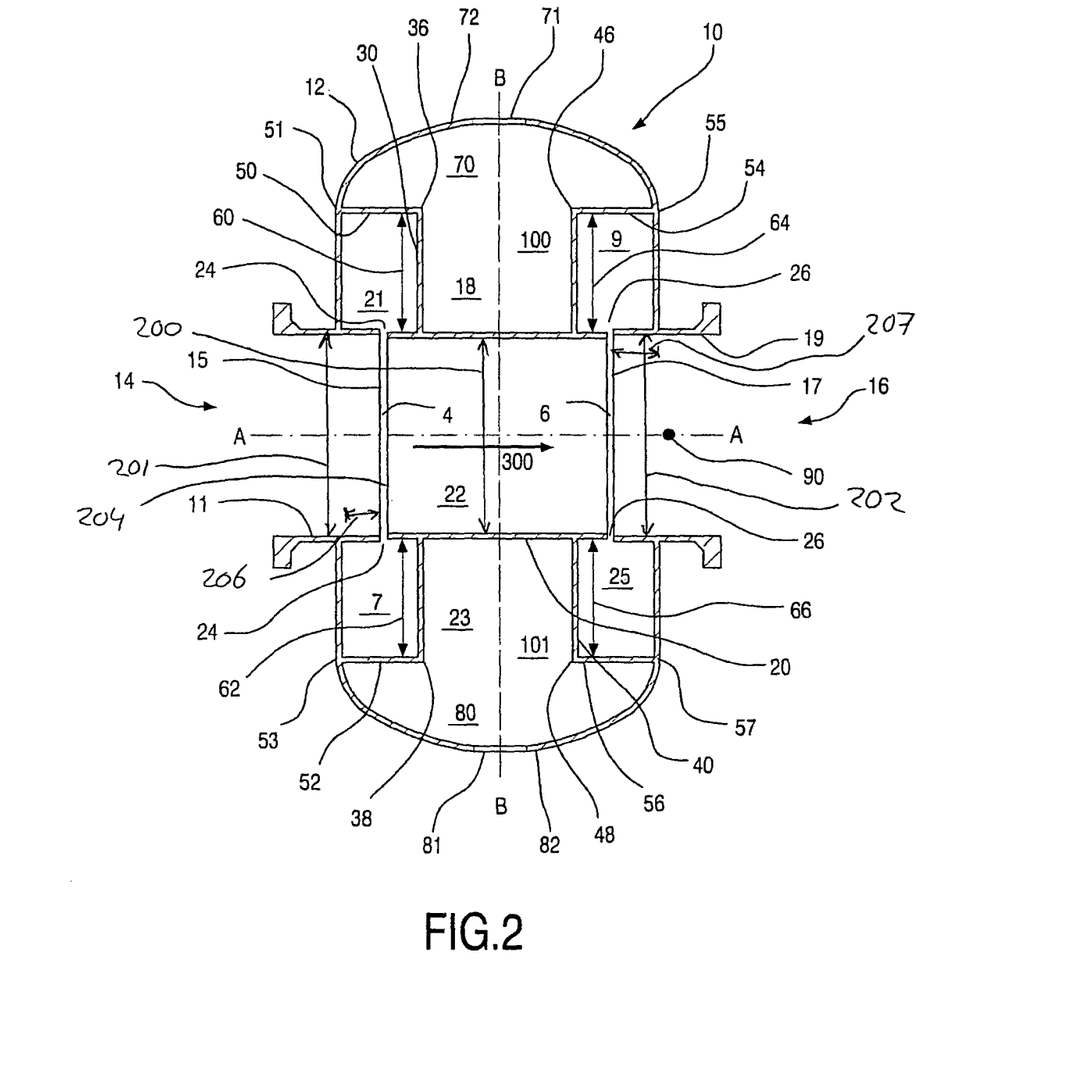
FIG. 2 shows a schematic longitudinal cross-section of the removal device according to the invention.
Figure 3:
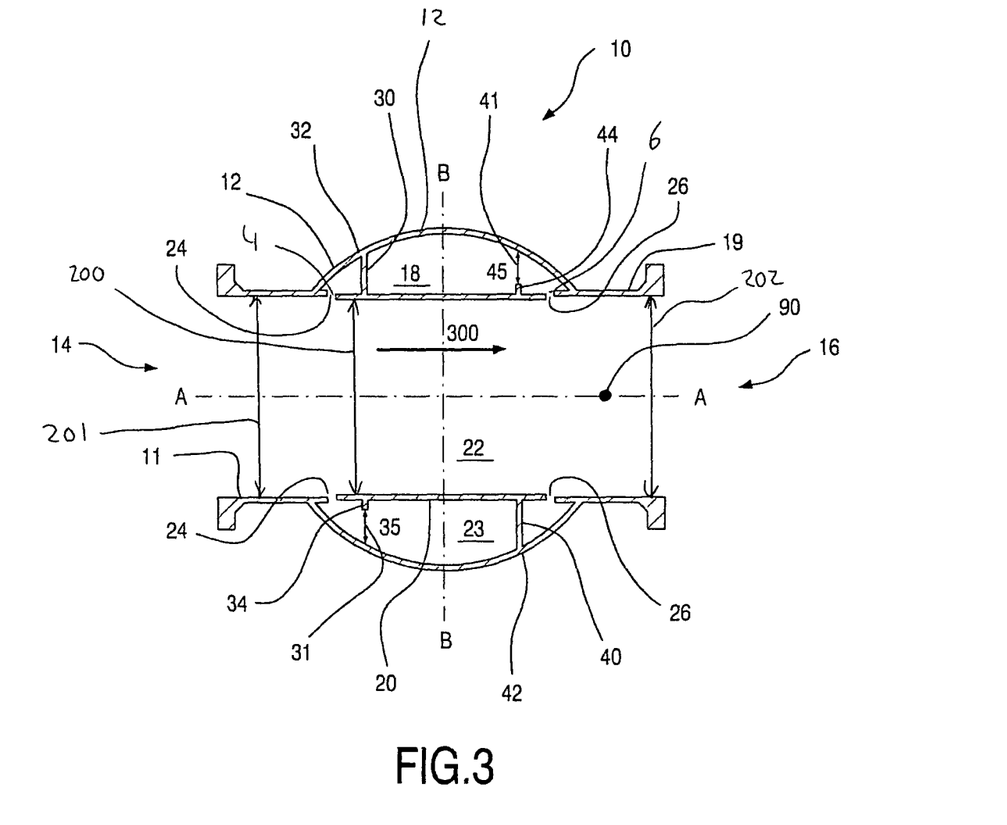
FIG. 3 shows a schematic cross-section in top view of the removal device according to the invention.
Figure 4:
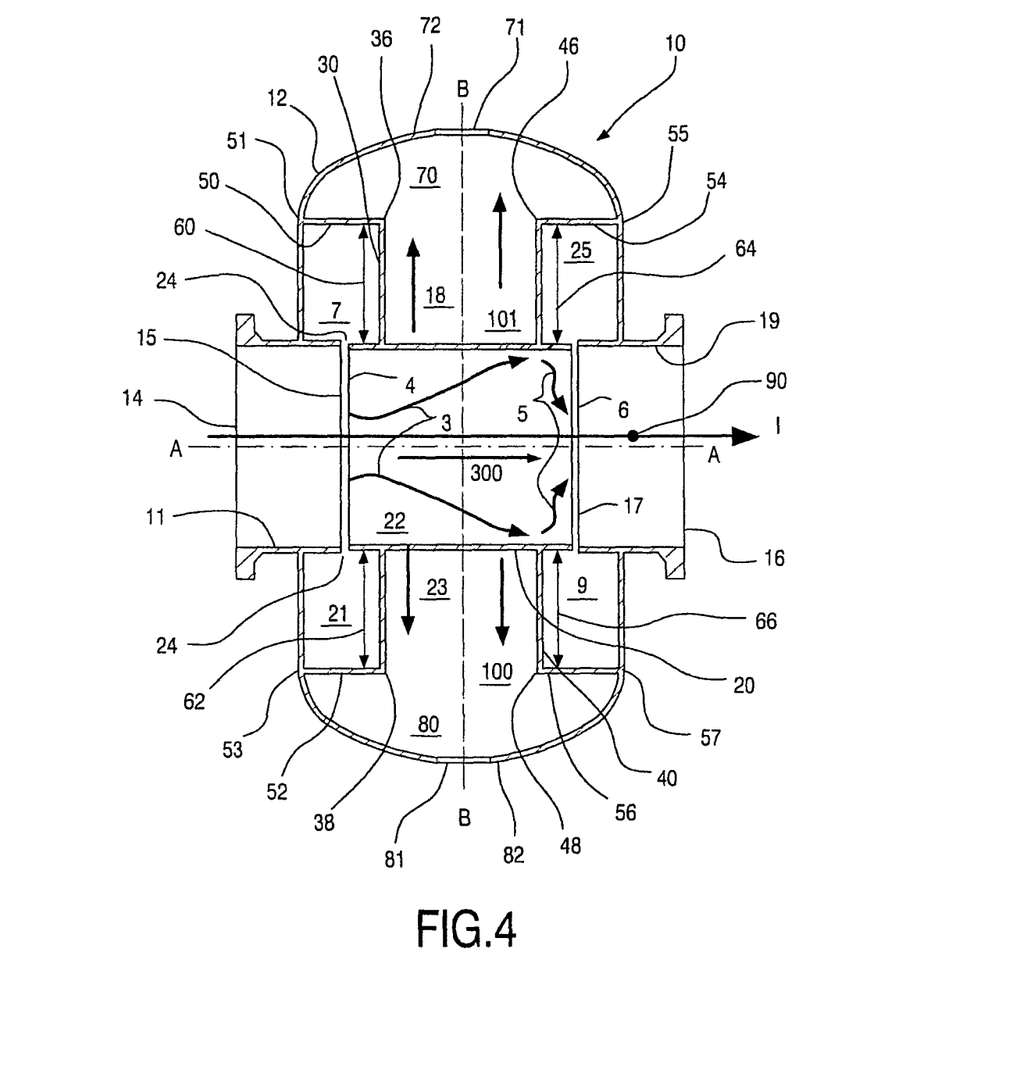
FIG. 4 shows a schematic longitudinal cross-section in side view of the removal device in use according to the invention.
Figure 5:
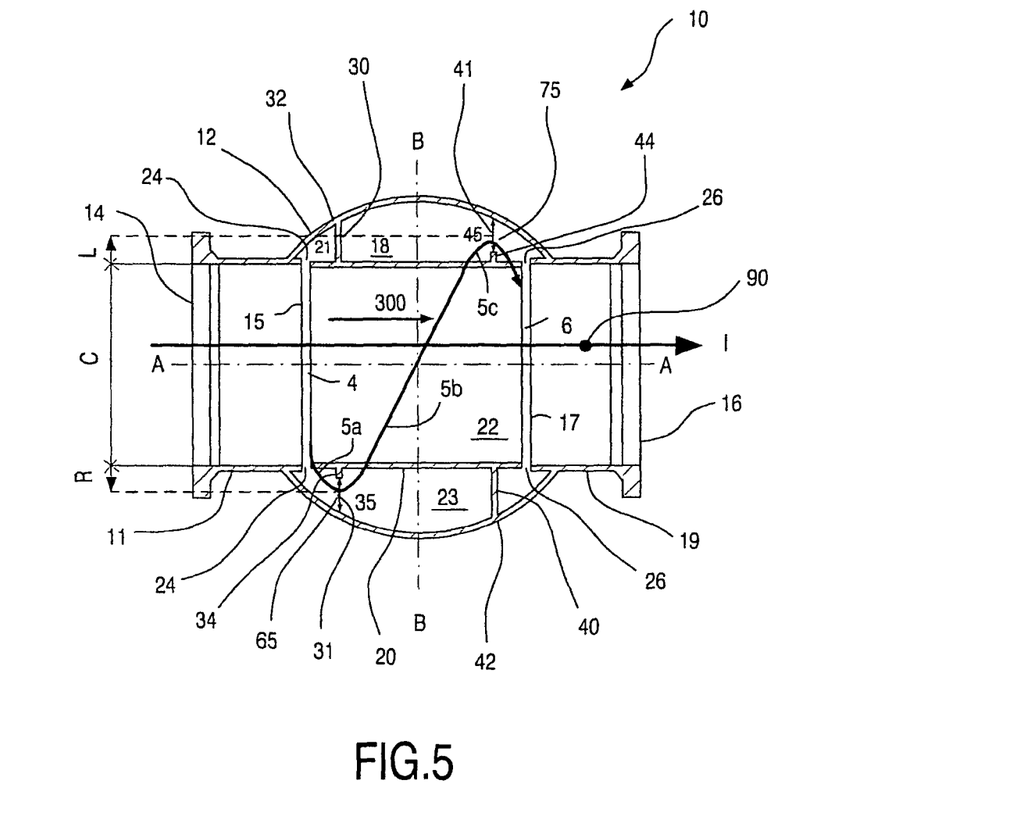
FIG. 5 shows a schematic cross-section in top view of the removal device in use according to the invention.

In use, shown in FIGS. 4 and 5, a liquid flows through the entry 14 towards the exit 16 in the main flow channel 22 defined by the tube 20. The branch flow passage 24, i.e. the gap 15 between the inlet 14 and the tube 20, allows a branch flow 3 to branch off from the main flow 1 and enter the chamber 21. The discharge of the branch flow will generally be relatively small in comparison with the discharge of the main flow. This has to due with the fact that these removal devices are provided in closed loop circuits, wherein the main flow passes by the removal device again and again. It is therefore not required to remove dirt, gas bubbles and contaminating liquids from the entire main flow during each passing by of the main flow.

In FIG. 4, the branch flows 3 are shown. It is noted that these branch flows 3 flow outside the tube 20, which is best viewed in FIG. 5. When the branch flow 3 enters the chamber 21, the branch flow velocity will decrease due to the increase in surface area.

In the chamber 21, the branch flow 3 spreads out over a substantial part of the height of the removal device. The chamber 21 thus functions as a distribution chamber. The chamber 21 is constructed to dissipate energy of the branch flow.

Through the constricted opening 31 defined by the distance 35 between the plate 30 and the housing 12, the liquid or liquid/liquid flows following flow trajectory 5a into a second chamber 23. This second chamber 23 is defined as the quiet zone 100 and comprises a central quiet zone 101, an upper quiet zone 70 and a lower quiet zone 80, where micro-bubbles and volatile compounds can rise and dirt can settle respectively.

Here, also a mixture of different liquids separates into separated liquids. Particles of a lighter liquid than the base liquid may rise and particles of a heavy fluid may settle.

The liquid slowly flows along a trajectory 5b towards a constricted opening 41 defined by a distance 45 between the plate 40 and the housing 12. The liquid or liquid/liquid then enters chamber 25 defined by the housing 12, the tube 20, the substantially vertical plate 40, and two substantially horizontal plates 54 and 56, which are connected to the housing 12 and the substantially vertical plate 40. Plate 40 is connected to the tube 20 and the housing 12. The liquid flows towards the return flow passage 26, which is defined as the distance 17 between the tube 20 and the exit 16. After passing the return flow passage 26, the return flow 7 merges with the main flow 1 in the main flow channel 22 at a merge point 90. A skilled person will understand that the merge point 90 is indicative and can be also a surface or a region where return flows 7 merge with the main flow 1.

In use, the branch flow trajectory 5a of the branch flow 3 is created by the restrictions or openings within the housing 12. In top view, the branch flow trajectory 5a, 5b and 5c is a 'zig-zag' flow trajectory and traverses the main flow channel 22. The branch flow 3 flows over and under the tube 20 in the central quiet zone 101 from a right side R of the quiet zone 100 to a left side L of the quiet zone 100, best viewed in FIG. 7. An example of this 'zig-zag' flow trajectory 5a, 5b and 5c is shown in top view in FIG. 5. In top view, a part of the branch flow trajectory, i.e. the trajectory part 5b, extends at an angle of at least 30 degrees to a direction 300 of the main flow.

Figure 7:
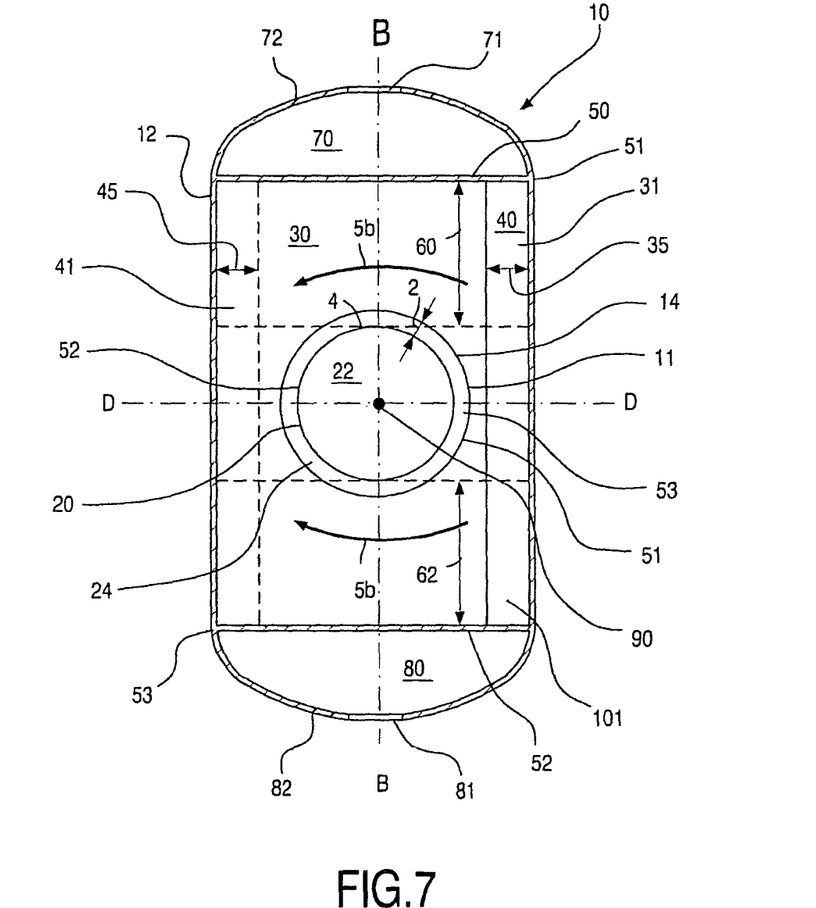
FIG. 7 shows a schematic longitudinal cross-section of the removal device according to the invention.

The distance which the flow will travel along the branch flow trajectory 5a, 5b and 5c, from the branch flow passage 24 to the return flow passage 26, is substantially longer than the distance travelled by the main flow 1 within the tube 20 between the branch flow passage 24 and the return flow passage 26. This, in combination with a decreased velocity, results in a relatively long residence time inside the quiet zone 100, which increases the separation of dirt particles and/or volatile compounds and/or gas bubbles.

The branch flow 3 flows in a substantially different direction than the main flow in the tube 20.

FIG. 6 shows a different embodiment of the intended invention 10, where a tube 20 extends between the inlet 14 and the exit 16. The tube 20 is connected to the housing 12 of the removal device 10. The tube 20 defines a main flow channel 22, wherein a main flow 1 flows in the direction 300 from the entry 14 tot the exit 16. Outside of the tube 20, two plates 30 and 40 are connected on the outside of the tube 20 and connected to the housing 12. The two plates 30 and 40 separate the inner space 18 of the housing 12 into three chambers 21, 23, and 25. At least one branch flow passage, which is defined as a constricted opening in the tube 20 near the entry 14, allows fluid communication between the main flow channel 22 and the first chamber 21. At least one constricted opening 31 in plate 30 allows fluid communication between the chamber 21 and chamber 23, wherein chamber 23 defines a quiet zone 100, wherein the quiet zone 100 comprises an upper quiet zone 70, a lower quiet zone 80 and a central quiet zone 101. The at least one constricted opening 31 causes the flow velocity to decrease. The flow velocity of the liquid within the quiet zone 100 will be substantially lower than the flow velocity of the liquid or liquid/liquid in the main flow channel 22.

The different embodiment of the invention, shown in FIG. 6, differs from embodiment of FIG. 1-5 in that entry tube 11, tube 20 and exit tube 19 are integral. At least one gap 94 and at least one gap 96 located in the tube 20, placed near the entry 14 and near the exit 16, define the at least one branch flow passage 24 and/or the at least one return flow passage 26. The shape of the gaps 94 and 96 can be transverse or placed at an angle compared to flow direction 300. The substantially small size of the at least one branch flow passage 24 and return flow passage 26 cause the flow velocity the decrease or increase respectively. This is in accordance to the law of conservation of mass flow.

Further, in the embodiment of FIG. 6, the branch flow will flow in substantially the same direction as the main flow in the quiet zone 100.

The flow will decrease in velocity when passing through the at least one constricted opening 31 in plate 30. After passing the at least one constricted opening 31 the flow enters a second chamber 23, which defines the quiet zone 100. The quiet zone 100 comprises an upper quiet zone 70, a centre quiet zone 101, and a lower quiet zone 80. Due to the small velocity, a relatively long residence time inside the quiet zone 100 is achieved, which increases the separation of dirt particles and/or volatile compounds and/or gas bubbles. This will also increase the separation of a liquid mixture into a separated liquids comprising of a higher lighter liquid and a lower heavier liquid.

The distributed openings 31, 41 cause a substantially evenly distributed branch flow in the quiet zone.

The flow will exit the quiet zone 100 through at least one constricted opening 41 in the plate 40 and enters a third chamber 25. In this chamber, the tube has at least one gap 96, defining the return flow passage 26, which allows a return flow 5 to leave the chamber 25 and merge with the main flow 1 at a merge point 90 within the main flow channel 22. A skilled person will understand that merge point 90 can be a point or a surface or an area where more return flows 5 will merge with the main flow 1.

Figure 8:
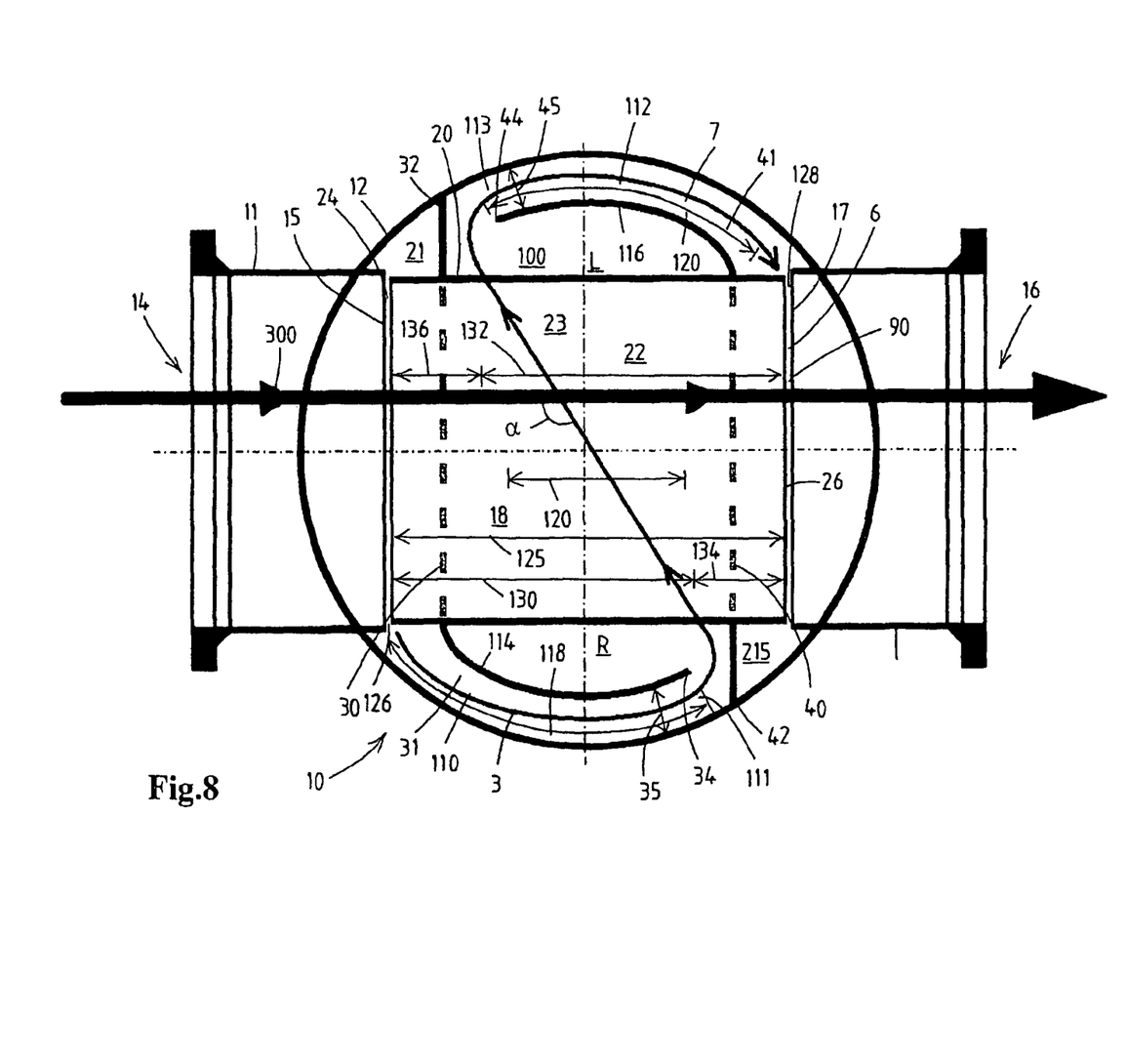
FIG. 8 shows a schematic top view of another embodiment of the removal device according to the invention.

Turning to FIG. 8, another embodiment according to the invention is shown. The embodiment is similar to the embodiment of FIGS. 1-5 and 7 in several aspects. However, the removal device is provided with a branch flow channel 110 and a return flow channel 112.

The channels 110, 112 are defined by respective plates 114, 116. The channels have a length 118, 120 and respective ends 111, 113 (or exit 111 and entrance 113). The channels 110, 112 are curved.

The channels 110, 112 extend over a distance 130, 132 in the direction 300 of the main flow.

The plate 114 is connected to plate 30 and the plate 116 is connected to the plate 40.

The channels 110, 112 extend along the wall of the housing 12. The plates 114, 116 and the wall of the housing are curved. The channels 110, 112 extend between the wall of the housing 12 and the plates 114, 116.

The exit 111 opens into the quiet zone 100. The entrance 113 allows entry of a return flow 7 from the quiet zone 100 into the branch flow channel 112.

The combined length 118, 120 of the channels 110, 120 is greater than a distance 124 between the branch flow passage 24 and the return flow passage 26. The exit 111 lies closer to the return flow passage 26 than to the entrance 113. The entrance 113 lies closer to the branch flow passage 24 than to the exit 111. A distance 134 between the exit 111 and the return flow passage 26 is smaller than the distance 132 between the entrance 113 and the branch flow passage 26. A distance 136 between the entrance 113 and the branch flow passage 24 is smaller than the distance 130 between the exit 111 and the branch flow passage 24.

In use, a branch flow 3 flows through the gap 24 into the chamber 21. Here, energy is dissipated and the velocity is reduced. The branch flow 3 subsequently flows through the branch flow channel 110 and exits the branch flow channel at the end 111 thereof. The branch flow enters the quiet zone, and traverses the main flow channel 22 from the right side R to the left side L.

The branch flow 3 enters the return flow channel 112 via entrance 113 and flows as a return flow 7 through the return flow channel 112 into the chamber 25. Subsequently, the return flow 7 flows through the gap 6 and merges with the main flow.

The shape of the combined branch flow/merge flow through the channels 110, 112 and the quiet zone 100 resembles an S-shape, when seen in top view. The branch flow 3 inside the quiet zone has a direction of flow which extends at an obtuse angle α to the direction 300 of the main flow. The branch flow 3 inside the quiet zone flows over a distance 120 which is opposite to the direction 300 of the main flow.

The branch flow channel 110 and the return flow channel 112 create a long travel trajectory of the branch flow 3 inside the quiet zone 100 and thus contribute to a long residence time of the branch flow inside the quiet zone. This results in a relatively high efficiency.

A skilled person will readily understand that the invention can be varied in multiple ways without departing from the scope of protection as is defined by the claims.

The invention claimed is:

1. A removal device for removing gas bubbles and/or dirt particles from a liquid in a liquid conduit system or for removing particles of a heavier or lighter liquid from the liquid in the liquid conduit system, the removal device comprising:
    a housing comprising:
        an entry,
        at least one exit,
        an inner space defined by the housing,
    at least one tube placed within the housing, wherein the at least one tube extends substantially between the entry and the exit, wherein the tube substantially defines an unobstructed main flow channel which allows the main flow to flow substantially unobstructed from the entry to the exit, wherein the tube has a circumferential wall which extends through the housing between the entry and the exit and which separates the main flow channel from at least one quiet zone,
    at least one branch flow passage located near the entry, the branch flow passage allowing fluid communication between the main flow channel and an area outside the tube and within the inner space defined by the housing,
    at least one return flow passage located near the exit, the return flow passage allowing fluid communication between the area outside the tube and the main flow channel, and
    the at least one quiet zone formed within the inner space, wherein—in use—at least one branch flow originating from the at least one branch flow passage enters the at least one quiet zone and flows through the quiet zone and from the at least one quiet zone as a return flow through the at least one return flow passage, wherein the liquid in the at least one quiet zone has a substantially smaller velocity than the liquid in the main flow channel, allowing dirt or particles of a heavier liquid to settle and/or allowing gas bubbles or particles of a lighter liquid to rise in the quiet zone,
    wherein the removal device comprises at least two plates, which are provided within the inner space defined by the housing, wherein the plates define a branch flow trajectory and—in use—guide the branch flow along the branch flow trajectory which comprises the quiet zone,
    wherein the inner space of the housing is divided by the plates in at least:
        a first chamber comprising the area, wherein the branch flow passage provides access from the main flow channel into the first chamber,
        a second chamber comprising the quiet zone, and
        a third chamber comprising the area, wherein the return flow passage provides access from the third chamber into the main flow channel,
    wherein the branch flow trajectory extends through the first, second and third chamber, and wherein at least one first constricted opening is provided between the first chamber and the second chamber, wherein at least one second constricted opening is provided between the second chamber and the third chamber, and
    wherein the first chamber and the at least first constricted opening are configured to distribute the branch flow over a substantial part of a height of the removal device.

2. The removal device according to claim 1, wherein the at least two plates are connected to the outer side of the at least one tube and connected to the housing of the removal device.

3. The removal device according to claim 1, wherein the at least two plates have at least one constricted opening or define the at least one constricted opening between an edge of the plate and the housing, wherein—in use—the branch flow flows through the at least one constricted opening.

4. The removal device according to claim 1, wherein the branch flow flows along a branch flow trajectory from the branch flow passage to the return flow passage, wherein in top view the branch flow trajectory does not extend substantially parallel to the main flow direction.

5. The removal device according to claim 1, wherein the branch flow flows along a branch flow trajectory which—in top view—has a substantially 'zigzag' form.

6. The removal device according to claim 1, wherein the branch flow flows along a branch flow trajectory, and wherein—in top view—a right part of the branch flow trajectory is located on a right side of the main flow channel, a left part of the branch flow trajectory is located on a left side of the main flow channel, and a central part of the branch flow trajectory traverses the main flow channel.

7. The removal device according to claim 1, wherein the at least one branch flow passage and/or the at least one return flow passage are defined by an opening in the at least one tube.

8. The removal device according to claim 1, wherein the at least one quiet zone comprises:
    an upper quiet zone,
    a lower quiet zone, and
    a central quiet zone,
        wherein the upper and lower quiet zone having—in top view—a greater surface area than the central quiet zone.

9. The removal device according to claim 1, wherein a space between the entry and/or the exit and the at least one tube defines at least one branch flow passage near the entry and/or at least one return flow passage near the exit.

10. The removal device according to claim 1, comprising a branch flow channel which is provided downstream of the branch flow passage and which extends over a distance in the direction of the main flow channel.

11. The removal device according to claim 1, comprising a return flow channel which is provided upstream of the return flow passage and which extends over a distance in the direction of the main flow channel.

12. The removal device according to claim 11, wherein the branch flow channel and return flow channel are curved and extend along the wall of the housing, when seen in top view.

13. The removal device according to claim 12, wherein the branch flow channel and return flow channel are defined between respective plates and the wall of the housing.

14. The removal device according to claim 11, wherein the branch flow channel originates at the constricted opening, and wherein the return flow channel connects to the constricted opening.

15. The removal device according to claim 11, wherein the branch flow channel and return flow channel create a branch flow/return flow having a substantial S-shape, when seen in top view.

16. The removal device according to claim 11, wherein the branch flow channel and return flow channel create a branch flow which flows over a distance which is opposite to the direction of the main flow.

17. The removal device according to claim 1, comprising a magnet which is provided at a dirt discharge for attracting dirt particles.

18. The removal device according to claim 1, wherein the entry is shaped as an entry tube extending inwards into the housing, wherein the at least one tube extends between the entry tube and the exit tube, wherein at least one gap is provided between the at least one tube and the entry tube, which gap defines the branch flow passage.

19. The removal device according to claim 1, wherein the entry is shaped as an entry tube extending inwards into the housing, wherein the at least one tube extends between the entry tube and the exit tube, and wherein the at least one tube has a diameter which is smaller than the diameter of the entry tube.

20. The removal device according to claim 1, wherein the tube is straight and in use extends horizontally, wherein a direction of settling and/or a direction of rising of the gas bubbles extends at a right angle with the straight tube.

21. The removal device according to claim 1, wherein the branch flow passage is constructed for only allowing a branch flow to flow out of the tube and not allowing a return flow to flow into the tube, and wherein the return flow passage is constructed to allow only a return flow to flow back into the tube and not a branch flow to flow out of the tube.

22. The removal device according to claim 1, wherein in top view a part of the branch flow trajectory extends at an angle of at least 30 degrees, more preferably at least 45 degrees, and in particular at an angle greater than 90 degrees to a direction of the main flow.

23. A method for manufacturing a dirt removal device according to claim 1, the method comprising providing a housing comprising an entry and an exit and providing at least one tube in the housing.

24. A method for removing dirt and/or volatile compounds and/or gas particles from a liquid or a liquid/liquid in a liquid conduit system, the method comprising providing a removal device according to claim 1 in a conduit and guiding a liquid flow or a liquid/liquid flow through the removal device.

* * * * *